United States Patent [19]

Kitaue

[11] Patent Number: 5,150,899
[45] Date of Patent: * Sep. 29, 1992

[54] HAND HELD VIDEO GAME WITH SIMULATED RESCUE

[75] Inventor: Kazumi Kitaue, Kobeshi, Japan

[73] Assignee: Konami Co., Ltd., Kobe, Japan

[*] Notice: The portion of the term of this patent subsequent to Jun. 9, 2009 has been disclaimed.

[21] Appl. No.: 470,953

[22] Filed: Jan. 26, 1990

[51] Int. Cl.$^5$ .......................... A63B 67/00; A63F 7/06
[52] U.S. Cl. ..................... 273/85 G; 273/433
[58] Field of Search ...................... 273/85 G, 433, 434

[56] References Cited

U.S. PATENT DOCUMENTS

| | | |
|---|---|---|
| 4,403,216 | 9/1983 | Yokoi . |
| 4,415,153 | 11/1983 | Yokoi . |
| 4,424,967 | 1/1984 | Yokoi et al. . |
| 4,438,926 | 3/1984 | Yokoi et al. . |
| 4,542,903 | 9/1985 | Yokoi et al. . |
| 4,582,322 | 4/1986 | Yokoi et al. . |
| 4,582,323 | 4/1986 | Minkoff et al. ............... 273/85 G |
| 4,895,376 | 1/1990 | Shiung-Fei ................... 273/85 G |

OTHER PUBLICATIONS

Xerographic copy of hand-holdable LCD game device and back side of associated packaging—Electronic Football.
Xerographic copy of hand-holdable LCD game device and back side of associated packaging—Electronic Baseball.
Xerographic copy of hand-holdable LCD game device and back side of associated packaging—Double Dragon.

Primary Examiner—William H. Grieb
Assistant Examiner—Jessica J. Harrison
Attorney, Agent, or Firm—Welsh & Katz, Ltd.

[57] ABSTRACT

A novel hand held electronic LCD video game with 19 player-controlled ninja turtle figures individually displayable under player manipulation to simulate rescue of a kidnap victim. The player controls the displayed position of the turtle figures to defend against attack by game controlled mouser figures and throwing star figures. A game processor controls display of player and game controlled image segments to simulate movement of mouser creatures and throwing stars attacking the player controlled turtle figures. The player controlled turtle is manipulated to perform simulated underwater swimming to obtain dynamite multiple times and a key to free the victim. The player must also manipulate the turtle figure to approach and free the victim while simulating punching and use of a sword to defend against attack. One of three levels of difficulty may be selected by the player.

1 Claim, 9 Drawing Sheets

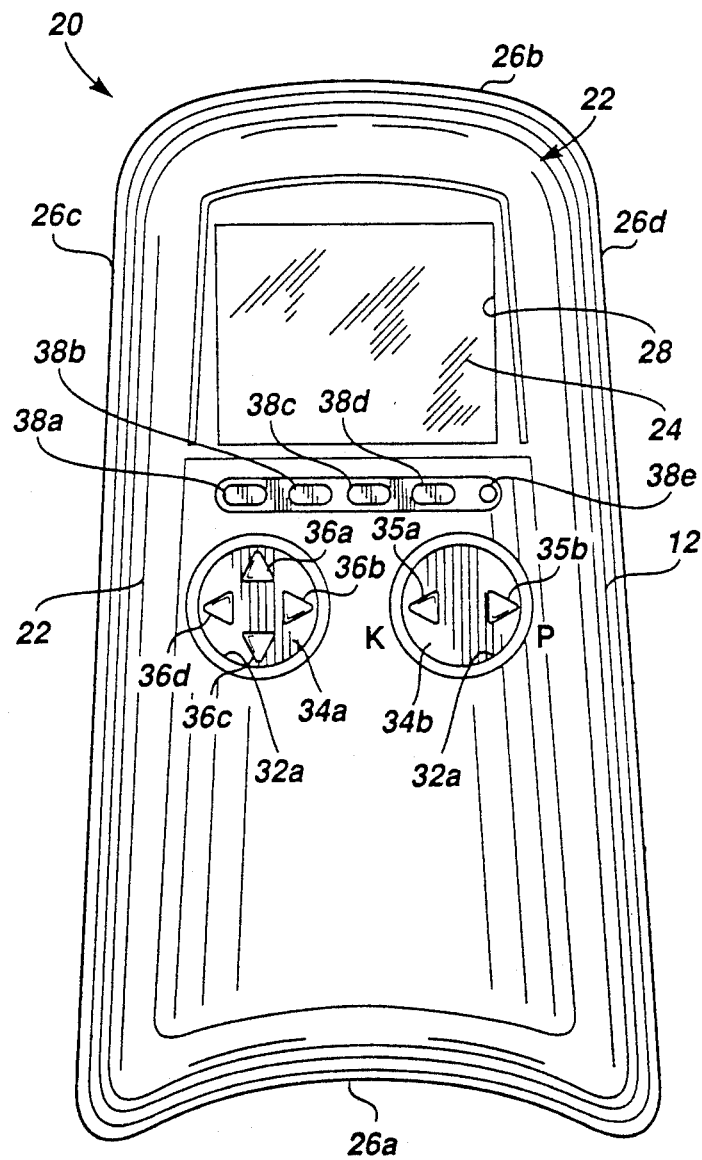

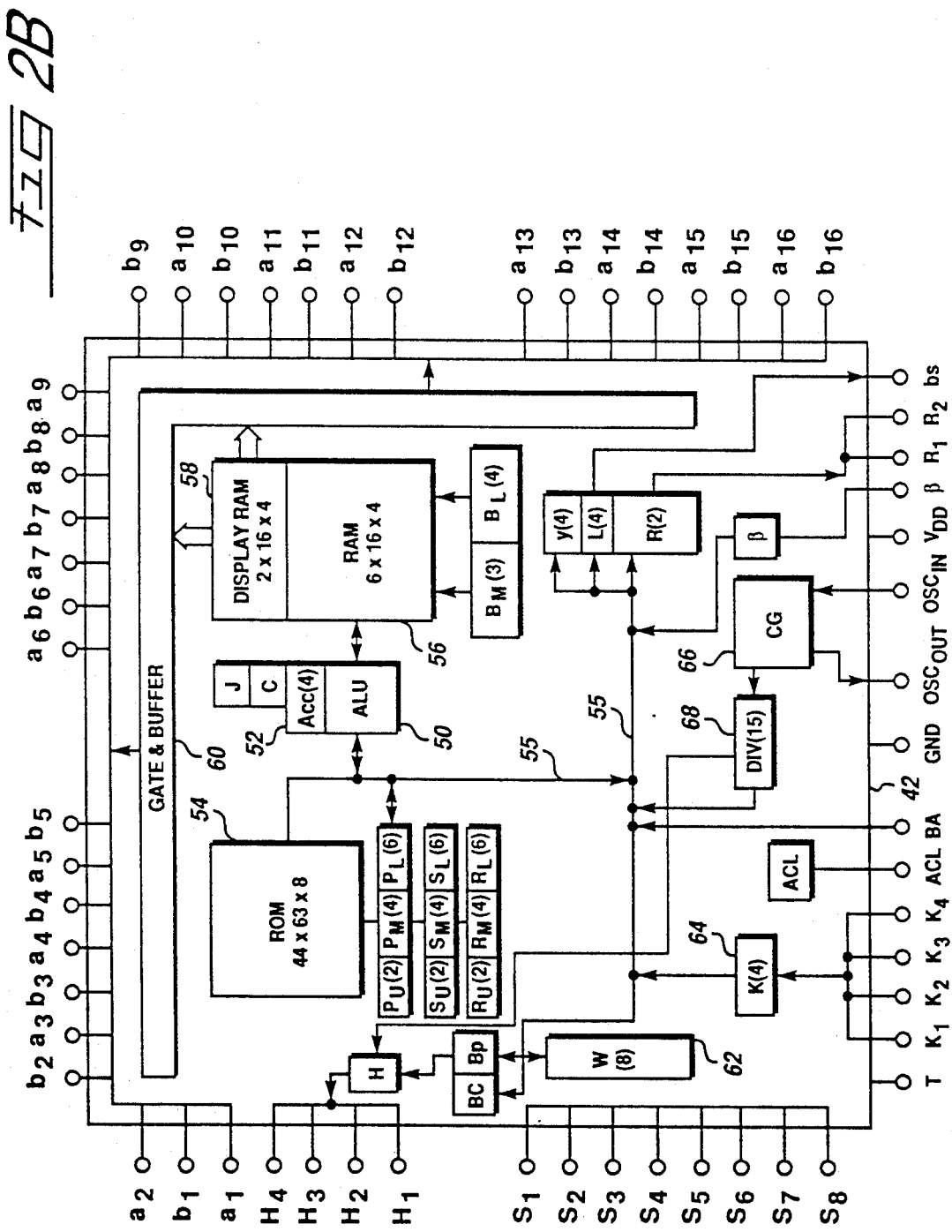

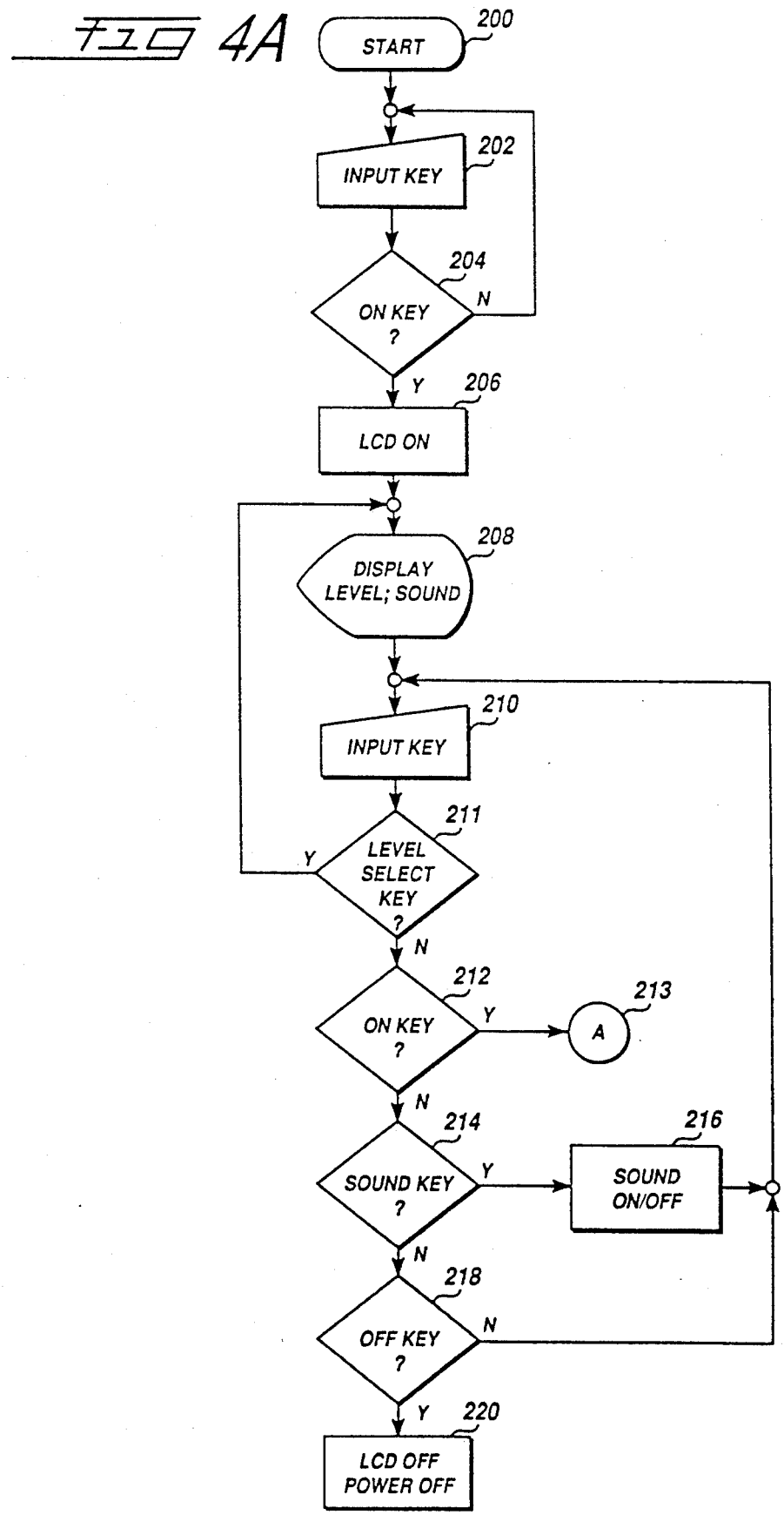

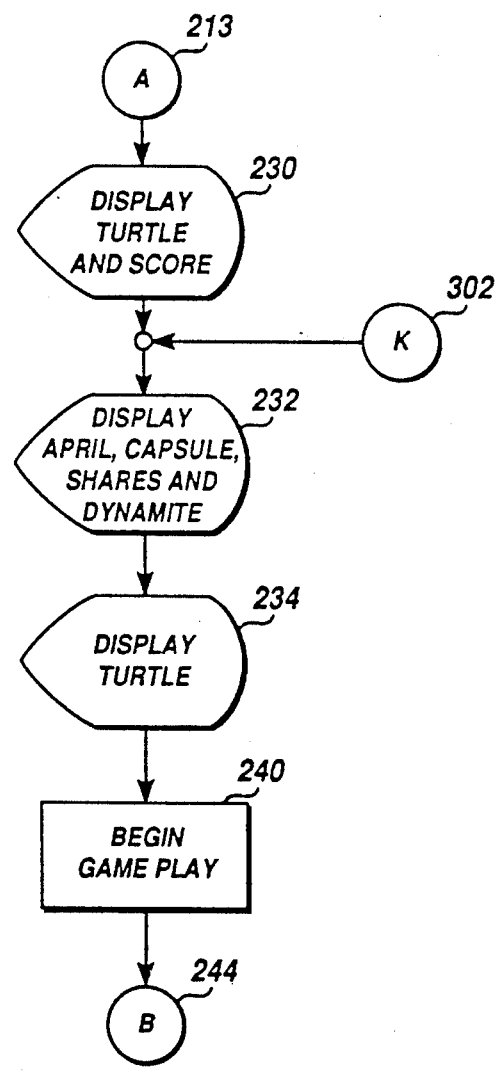

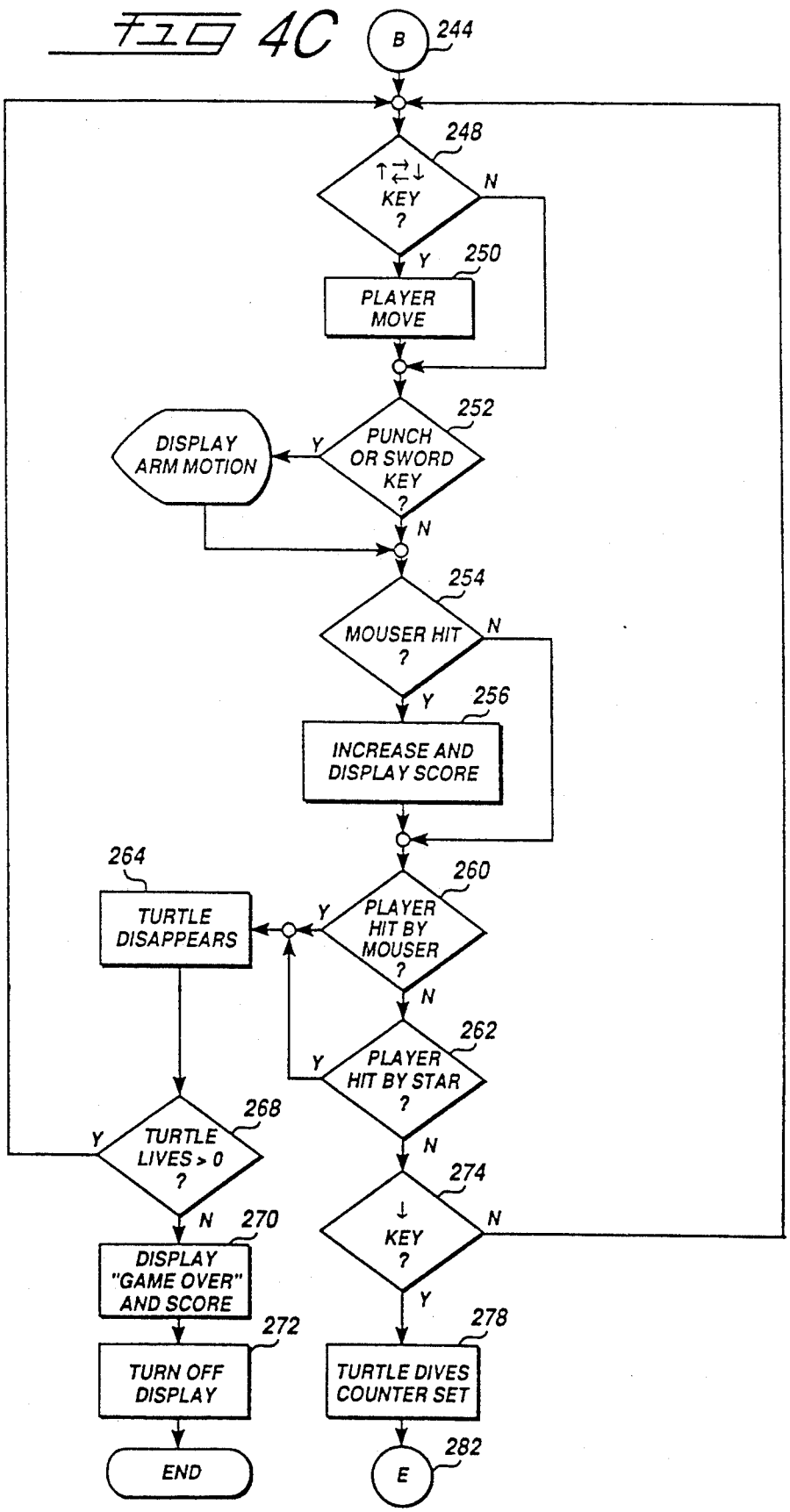

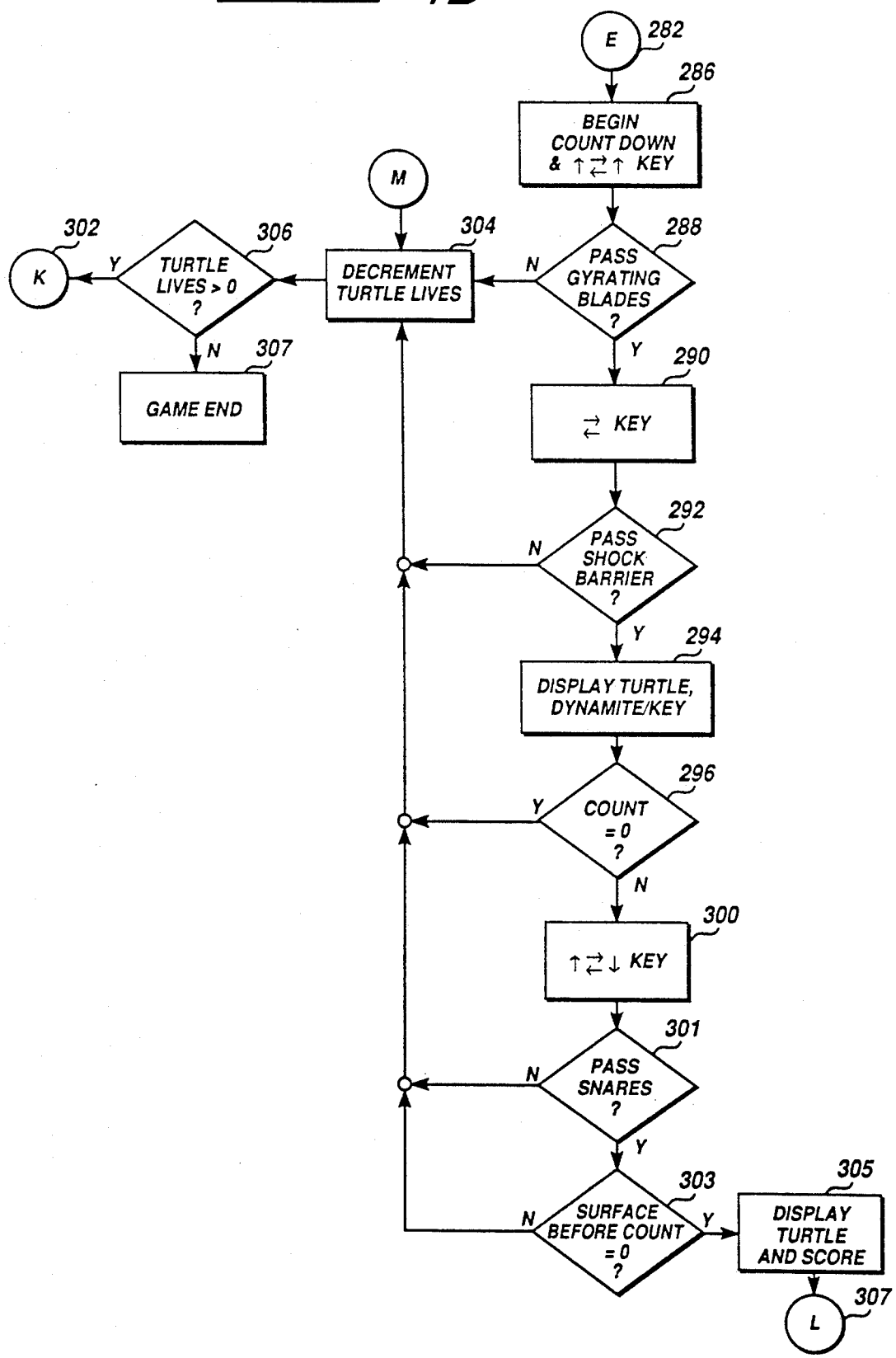

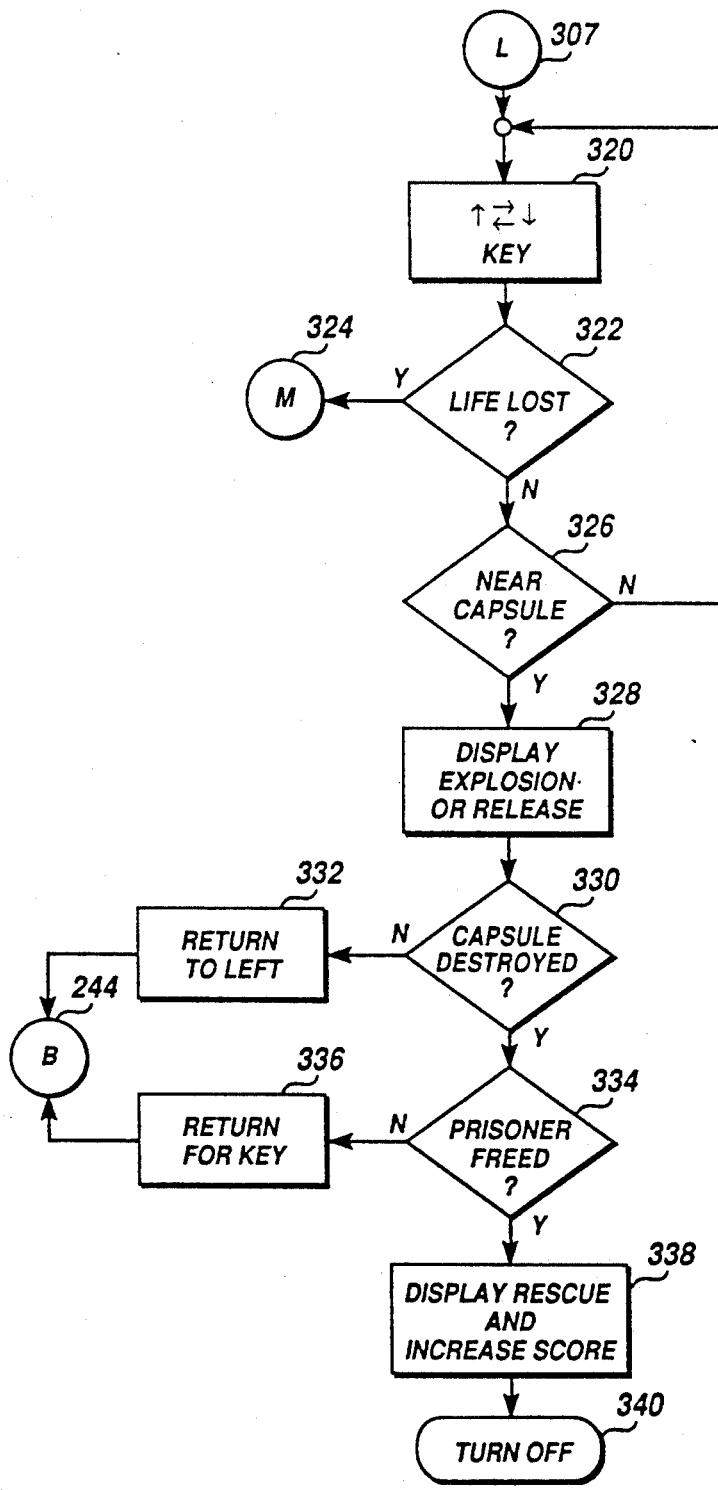

HAND HELD VIDEO GAME WITH SIMULATED RESCUE

The present invention relates generally to the field of electronic games and more particularly to a novel hand held electronic video game.

The advent of video display devices such as liquid crystal displays (LCD) employed in electronic games has led to the development of hand held electronic video games which can be held in the player's hands while allowing the player to manipulate the controls and observe a video display. Such electronic games are know in which a player causes the movement of a games object such as a dart, horseshoe, or ping pong ball. The movement of the game object can be influenced by the player. Some prior art games permit changing of the movement of the game object in a manner unknown to or not easily predictable by a player with reference to predetermined positional relationships between player controlled and games controlled symbols. Also, games are known in which a game object may be manipulated by a player to try to avoid randomly generated obstacles.

It is accordingly an object of the present invention to provide a novel video game suitable for hand held play using an LCD video display.

It is another object of the invention to provide a figure displaying electronic hand held game apparatus with which a novel game of rescue can be played.

It is another object of the invention to provide an electronic hand held game with a plurality of individually displayable player controlled turtle figures manipulatable by the player to simulate rescue of a prisoner by retrieving dynamite and a key from underwater and simultaneously defending against simulated attack by game controlled attack figures.

Accordingly, in accordance with one embodiment of the invention, there is provided a hand-held image displaying electronic game apparatus including a plurality of manually operable control pushbutton switches for permitting control of the play of the game by a player, a sound transducer for generating sound, a control circuit coupled to the control switches and the sound transducer including a processor, a read-only memory, and a random access memory, for generating game control signals and sound signals. Also included is a display having selectively activatable image segments corresponding to a plurality of player-controlled figures, to a plurality of game-controlled figures, and to alpha-numeric game information for selective display thereof. The display is responsive to the control circuit for display of game images responsive to the game control signals such that only one player-controlled figure is visually displayed at one time at only one of a plurality of pre-determined positions and the position at which the player-controlled figure is displayed is moveable to an adjacent position responsive to activation of a first set of the control switches. Some of the plurality of positions correspond to underwater positions with associated game controlled intermittently activated snare device image segments, and some of said plurality of positions correspond to above-water positions with associated game controlled attacking image segments. The processor generates signals to display destruction of the player controlled image while in an underwater position in response to movement through one of the snare devices during an activated period, and while in an above-water position in response to simulated collision with an attacking image segment. A control switch enables the player to destroy an attacking image segment prior to simulated collision.

BRIEF DESCRIPTION OF THE DRAWINGS

The invention, together with further objects and advantages thereof, may be understood by reference to the following detailed description taken in conjunction with the accompanying drawings wherein like reference numerals designate like elements throughout several figures.

FIG. 1 is a front elevational view of a housing for a specific embodiment of a hand held electronic LCD video game constructed in accordance with the invention.

FIG. 2B is a detailed block diagram of a specific embodiment of the processor for the hand held LCD video game of FIG. 2A.

FIG. 4A-4E are flow diagrams illustrating the game control sequence and game play methodology of a specific embodiment of a control program for the game processor 42 according to the invention.

DETAILED DESCRIPTION OF THE PREFERRED EMBODIMENT

Figure 2A:
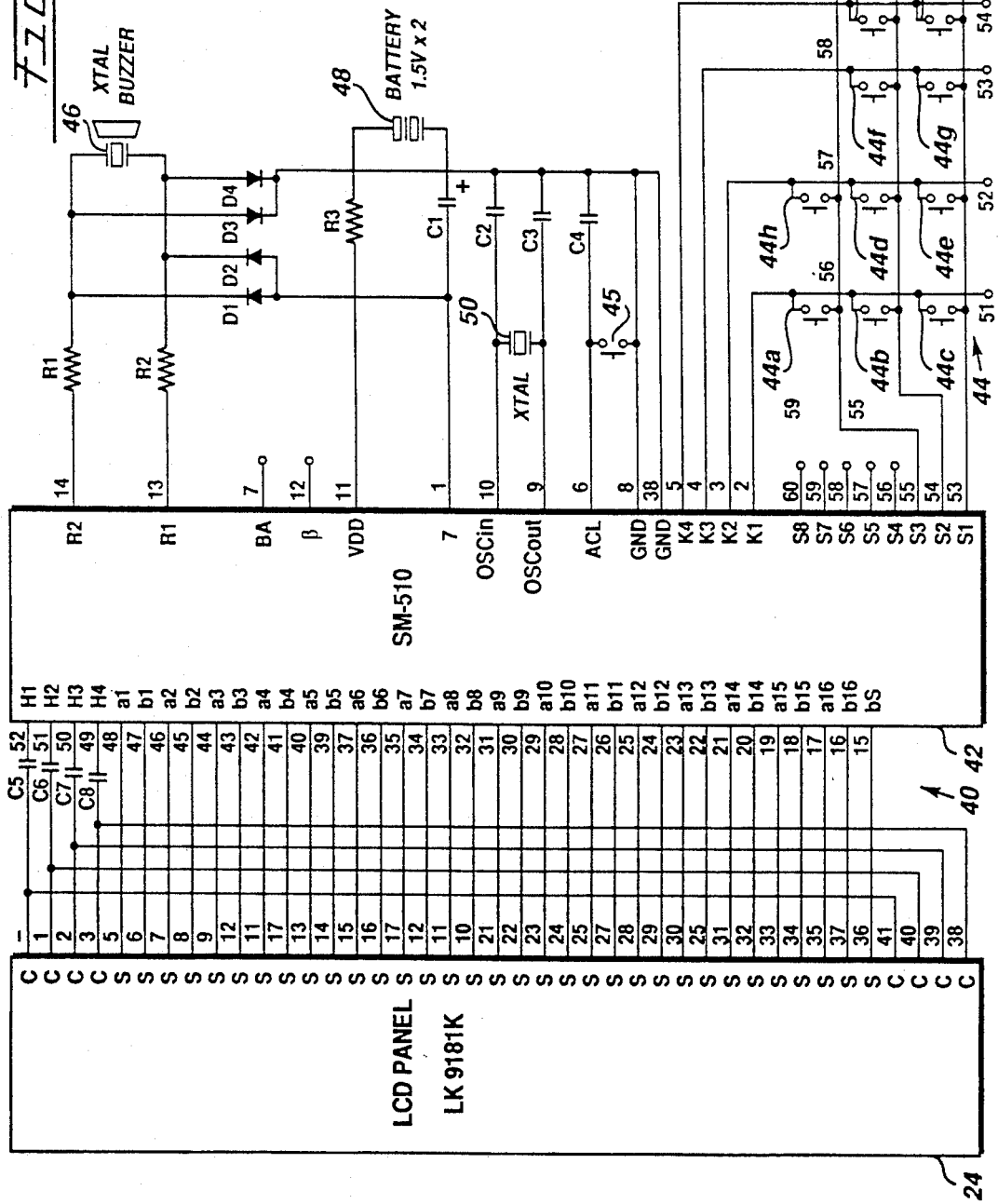
FIG. 2A is a block diagram of the electronics of a specific embodiment of a hand held LCD video game in accordance with the invention.

Referring now to the drawings, FIG. 1 is a front view of a hand held game 20 in accordance with the present invention comprising a casing 22 configured for housing various electronic components and a display 24. The casing 22 has a generally trapezoidal configuration, as shown in FIG. 1, defined by a bottom peripheral edge surface 26a formed as a concave arcuate edge surface, a top edge surface 26b formed as a convex arcuate surface and generally longitudinally rectilinear lateral edge surfaces 26c and 26d. The laterally opposite ends or corners of the bottom and top arcuate edge surfaces 26a and 26b, respectively, blend with the lateral edge surfaces 26c and 26d through rounded corner edge surfaces, as shown. Casing 22 in the illustrated embodiment is approximately 7 inches long, 4¼ inches wide at the bottom end, and 3¼ inches wide at the top end. The casing 22 is preferably formed of a suitable rigid plastic material to contain and protect the game electronic circuitry.

The casing 22 has a generally rectangular opening 28 behind which may be mounted the display screen 24 suitably observable in the opening 28. In the illustrated embodiment, the display 24 is a liquid crystal display (LCD) screen, but may alternatively employ another type of display screen suitable for a hand held game such as electroluminescent, electrochromic, etc. The display screen 24, as will be described in greater detail hereinafter, is formed with segments for displaying images for the game, as well as numerical value and other game information displaying portions for displaying game scores and other game-related information.

In addition, various pushbuttons for control of the game, such as control of the visual display of the game images when playing the game, are provided in the vicinity of the display opening 28 of the casing 22. In the illustrated embodiment, the casing 22 has a pair of circular openings 32a within which may be supported control buttons 34a and 34b, respectively, forming part of the video display control circuitry. Circular buttons 34a and 34b may optionally be of equal diameter and symmetrically located about the longitudinal center line of the casing 22, as shown. In the illustrated embodiment, the button 34a activates a four-way switch (i.e., four pushbutton switches) with four activation positions indicated by four arrowheads 36a, 36b, 36c and 36d which may be manually manipulated by the player to control, for example, the up, down, right and left movement (i.e.,. up if the upper arrow 36a is depressed, down if the lower arrow 36c is depressed, right if right arrow 36b is depressed and left if left arrow 36d is depressed) of a player controlled figure, to be described in detail hereinafter. The button 34b, in the illustrated embodiment, may be manually manipulated by the player to control simulated attack by the player controlled figure by sword or by punching on the display screen 24 as will be described in detail hereinafter. In the illustrated embodiment, the button 34b activates a dual switch (i.e., two pushbutton switches) with two activation positions indicated by two arrowheads 35a and 35b which may be manipulated by the player to control attack (i.e., by punching if the right arrow 35b is depressed and by sword if the left arrow 35a is depressed.)

A plurality of generally equal oblong openings to receive pushbutton controls 38a, 38b, 38c and 38d and a smaller round opening to receive a pushbutton control 38e may also be formed in the casing 22 such that there axis lie along a common line transverse to the longitudinal access of the housing 10, as shown. The pushbuttons 38a, 38b, 38c, 38d, and 38e facilitate selective control of switches which control aspects of the electronic circuitry of the video game 20.

In the illustrated embodiment, the pushbutton 38a controls an off switch to permit the player to turn the game off and the pushbutton 38d controls a reset switch for which permits the player to turn the game on and to control the start of the game play. The pushbutton 38b controls a sound control switch which allows the player to turn game sounds on and off. In the illustrated embodiment, the pushbutton 38c controls selection of the game level to be played while the pushbutton 38e controls a reset switch for resetting the game after inserting batteries.

FIG. 2a is a block diagram illustrating a specific embodiment of the internal electronic circuitry 40 of the hand-held game 20. The electronic circuitry 40 includes the LCD display screen 24 (e.g., an LH9181K LCD display marketed by Sharp) coupled to a game processor 42 (e.g., an SM-510 marketed by Sharp) as shown. The game processor 42 controls the game display 24 by controlling LCD image segments of the game display 24, and also controls game sound outputs, both responsive to the pushbutton switch control inputs. A set of 11 pushbutton switches 44a–j and 45 is coupled to the game processor to provide control inputs. In the illustrated embodiment, the switches 44a–j and 45 correspond to the control pushbuttons 34a, 34b, 38a–38e of FIG. 1 For example, switches 44a through 44d may correspond to pushbutton 34a (i.e., pushbutton arrows 36a through 36d), switches 44e and 44f may correspond to arrows 35a and 35b of pushbutton 34b, switches 44g–44i may correspond to pushbuttons 38a–38d, and switch 45 may correspond to reset pushbutton 38e. A crystal sound transducer 46 is coupled, as shown, to the processor 42 to generate game sounds responsive to sound signals generated by the processor 42. A battery 48, which provides electrical power for the circuitry 40, and an oscillator crystal 50 for use in generating clock signals in conjunction with associated capacitors is also coupled, as shown, to the processor 42.

Referring now to FIG. 2B, there is shown a detailed block diagram of a specific embodiment of the game processor 42 with pin designations corresponding to those shown in FIG. 2A. The processor 42 comprises an arithmetic logic unit (ALU) 50 and associated registers 52 coupled along with a read only memory (ROM) 54 to a central bus 55. A random access memory (RAM) 56 including a display RAM 58 is coupled directly to the ALU 50 and to a gate and buffer circuit 60, as shown. The gate and buffer circuit couples display segment control signals to the segment control outputs $a_1$–$a_{16}$ and $b_1$–$b_{16}$, as shown. The control switch inputs $S_1$–$S_8$ and $K_1$–$K_4$ are coupled respectively through interface buffers 62, 64 to the ALU 50 through the bus 55. In addition, a clock signal circuit 66 couples clock signals to the bus 55 through a divider 68.

The processor 42 generates image segment control signals and sound signals by processing the control switch inputs responsive to a game program stored in the ROM 54 utilizing the RAM 56 for temporary storage. The ROM 54 stores the game program and stores the data needed for controlling the image segments of the display 24. The display RAM stores the current image segment control data, which is coupled to the display to control the game images.

Figure 3:
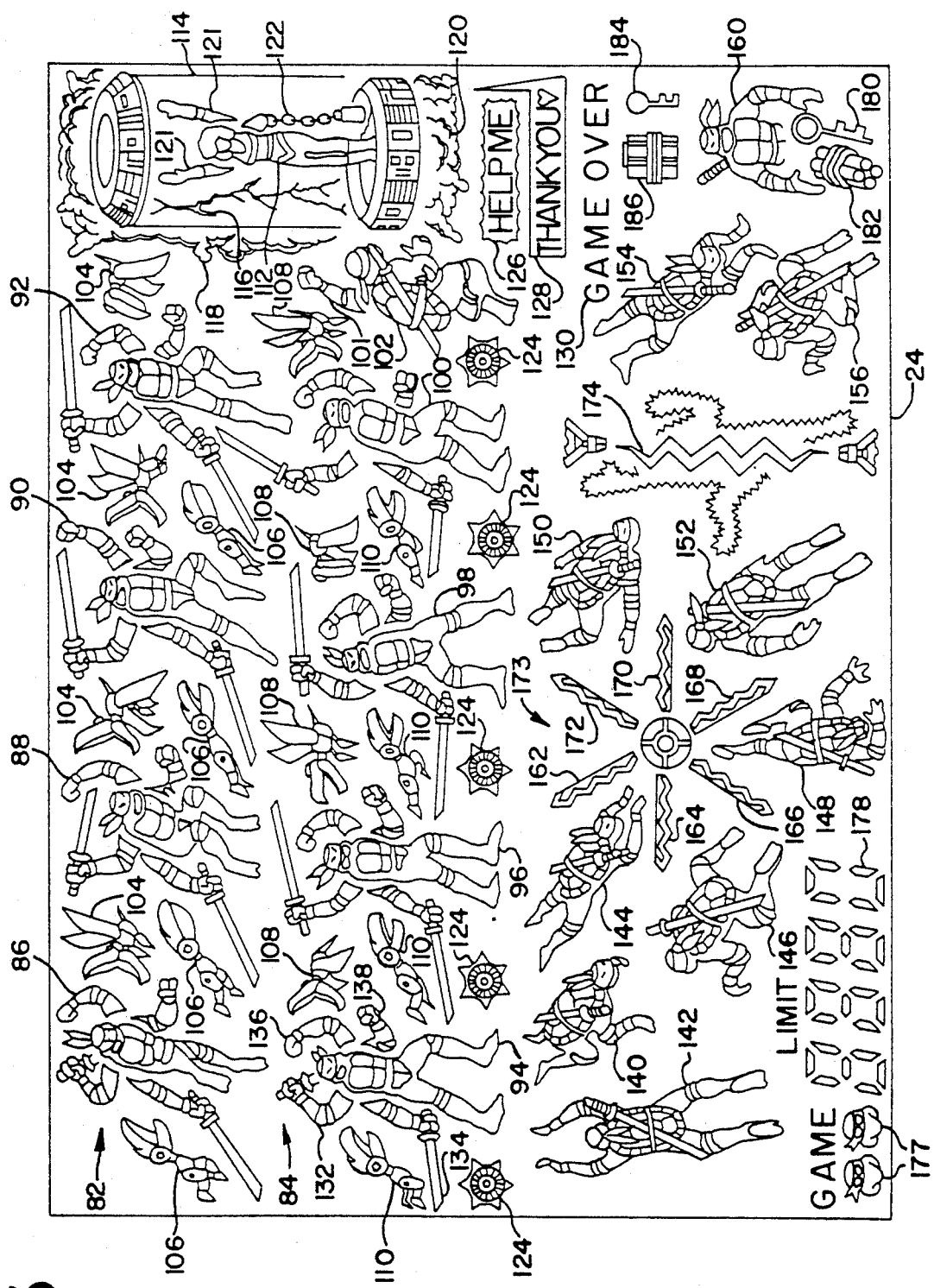
FIG. 3 is a diagrammatic view illustrating a specific embodiment of a detailed pattern for a display of the embodiment of FIG. 1.

FIG. 3 is an illustration of a specific embodiment of a display pattern made up of selectively activatable images or image segments for the display 24, each of which when activated become visually displayed. The game displayed by the image display screen 24 of the illustrated embodiment is a game in which an image of a player controlled figure (a ninja turtle image) carrying a sword can attack using the sword or by punching to destroy enemy mousers at an enemy base.

The player must manipulate the ninja turtle image through the enemy base to rescue a prisoner (April) who is hand-cuffed and held prisoner in a capsule at the enemy's base. The ninja turtle image must sneak into the base attacking mousers to get through and retrieve a bundle of dynamite and a key to the hand-cuffs which are hidden under water. There are three levels of difficulty which may be chosen by the players, and three turtles are allotted to the player at the beginning of each game. The turtle image uses the left hand for swinging a sword and light hand for punching to fight off enemy mousers which attack from both sides and to obtain score points for destroying mousers. The turtle obtains the bundle of dynamite located under water by diving into the water which starts a countdown timer, and avoiding two snare devices (gyrating blades and shock barrier). After obtaining the dynamite the turtle image returns to the surface, advances to the capsule, and sets off the dynamite. The turtle must then return for more dynamite or for the key to unlock the handcuffs.

The display 24 comprises selectively activatable figures (i.e., image segments), including 2 horizontal rows 82, 84 from left to right of player controlled figures at the upper half of the display 24. Of these rows, row 82 comprises four player controlled figures (turtle images) 86–92 at the top while row 84 comprises five turtle images 94–102, as shown. Each row 82, 84 also includes two rows of game-controlled image segments of enemy mousers including flying mousers 104 and mousers 106 in upper row 82, and flying mousers 108 and mousers 110 in row 84. At the upper right are image segments of the prisoner (April) 112, the capsule 114, a capsule crack 116, explosion indicating image segments 118, 120, and hand-cuffs 122. At the bottom of row 84 is a row of throwing stars 124. At the right of the display 24 under the capsule 114, image segments 126 displays "HELP ME", image segments 128 displays "THANK YOU" and image segments 130 displays "GAME OVER", as shown. The player controlled turtle images each have two sets of arms, as shown at turtle image 94. Two sword carrying arms 132, 134 permit simulation of swing of a sword, and two punching arms 136, 138 permit simulated punching by sequential momentary display of the two arms.

Along the lower half of the display 24, are arranged a series of ten player-controlled turtle images 140–160 which are "under water" in the play of the game. Also under water is a set of gyrating blade image segments 162–172 and an electric shock barrier image segment 174 which simulates underneath snare devices. Within the underwater section in the lower left of the display 24 is a four digit, 7-segment display 178 and a display of "LIMIT" and "GAME" for displaying game score, underwater limit time and game level. In the lower right corner of display 24 is an image segment of a key 180 and dynamite 182. Above the turtle image segment 160 is an image segment to indicate carrying of the key 184 and an image segment 186 to indicate carrying of the dynamite.

During play of the game, only one of the player-controlled turtle images 86–102, 140–160 is visually displayed at any time. The player may move the displayed player-controlled turtle image by activating the left control pushbutton 34a. Thus, by pushing on the up arrow button position 36a, the player image above the previously displayed image is displayed, simulating upward movement, while pushing on the down arrow region 36c causes simulated movement downward on the display 24. Similarly, simulated left or right horizontal movement is activated by pushing the left arrow region 36d or right arrow region 36b of control pushbutton 34a.

Activation of the left arrow 35a of the control pushbutton 34b momentarily visually displays in succession (e.g., total time of 0.3 seconds in the illustrated embodiment) the upper sword arm image 134, the lower sword arm 132 and the upper sword arm of the currently displayed player control turtle image 86–100, thereby simulating a swing of the sword of the player-controlled image. Activation of the right arrow region 35b of pushbutton 34b momentarily visually displays a succession of the lower punching arm 138, then the upper punching arm 136 and then the lower punching arm 138 (e.g., a total time of 0.3 seconds in the illustrated embodiment) again to simulate a punch by the player controlled turtle images 86–100. These two attack movements, sword swing and punch, are the method by which the player-controlled turtle image attacks and destroys attacking mouser images 104–110. Thus, the player-controlled images 86–102, 140–160 may be manipulated by moving them to one of eighteen positions and by controlling turtle images 86–100 to attack, using pushbuttons 34a and 34b respectively.

Simulated movement of the enemy mousers 104–110, throwing stars 124, gyrating blades 162–172 and shock barrier 174 is provided under control of the game electronic processor 42 by visual display of image segments in a sequence. Thus, the flying mousers 104, 108 are caused to appear to advance from the right to the left of the display 24 at a uniform speed by sequentially displaying images generally from the right to the left of the display 24 and can be destroyed by the turtle punching. In the illustrated embodiment, one place movement of a mouser takes 0.8 seconds for level one play, 0.6 seconds for the level two and 0.4 second for level three play. Enemy mousers 106 and 110 appear to move left to right in the same manner with corresponding time delays of 0.9 seconds, 0.7 seconds and 0.5 seconds for respective levels one, two and three in the illustrated embodiment and can be destroyed by the turtle sword. Similarly, throwing stars 124 are sequentially displayed along a line to simulate movement from left to right with a time delay per place movement, in the illustrated embodiment, of 0.7 seconds, 0.5 seconds and 0.3 seconds, respectively for levels one, two and three.

The game is initiated, as shown by blocks 200, 202 and 204 of FIG. 4A, by pushing the on/start pushbutton (i.e., key) 38d which activates the display 24 to display "GAME 1" on the alpha-numeric seven segment display 178 and will generate a game sound, as shown at blocks 206 and 208. The game level is selected by pushing the game level select pushbutton 38c which will result in display of "GAME 2" if pushed once, "GAME 3", if pushed twice and back to "GAME 1" if pushed again, as indicated at blocks 208, 210 and 211. Game play is begun, as shown at blocks 212 and 213, by pushing the on/start key 38d a second time. This results in branching to the routine of FIG. 4B as illustrated at branch point 213. If the game play is not initiated at block 212 by activating the on key, program control continues to the decision block 214. As illustrated by blocks 214 and 216, the sound may be deactivated so that the game is silent by depressing the sound on/off key 38b or can be reactivated by depressing the sound on/off key 38b again. As illustrated at blocks 218 and 220, the game may be turned off at any time by depressing the power off key 38a where upon the game sequence returns to block 200 to permit restart of the game.

A second depression of the on/start key 38d, as illustrated at block 212, will result in branching to FIG. 4B, as shown at mode 213. As illustrated at block 230 of FIG. 4B, the second depression of the on/start key activates the display of two turtles 177 (indicating allocated turtle lives remaining in game) and a "00 00" score for one second on the digital display 178, as shown at block 230. This is followed by display of the prisoner 112, the capsule 114, the underwater snares 173 and 174 and the dynamite 182 for several seconds along with a sound beep, as illustrated at block 232. This is followed by display of a turtle image 86 at the top left of the display 24 which then slides down to display turtle image 94 after a second, as illustrated at block 234. Each game begins with an allocation of three operator-controlled turtle players. If all three players are destroyed, the game is over. The enemy mousers 104–110, and stars 124 then begin to attack the operator-controlled turtle image 94 from both sides and the game play begins (i.e., simulated movement by sequentially displaying images) as indicated by block 240.

As illustrated, game play proceeds from branch point 244 to blocks 248 and 250 of FIG. 4C, where the player may manipulate the controls 34a to avoid attack of the aliens by pushing the up key region 36a of key 34a to jump to avoid an attacking star 124, as indicated by blocks 248 and 250. The star 124 cannot be destroyed, but can only be avoided by jumping out of the way. Thus, at any position, the player-controlled turtle image can avoid the star by activation of the up arrow 36a and then is returned to ground level from the top position by activation of the down arrow 36c. In addition, by activating the right arrow key 36b or left arrow key 36d, the turtle can be manipulated right or left. The player symbol may also be manipulated to punch or swing a sword to destroy an attacking mouser by activating the sword key 35a, or the punching key 35b as indicated by blocks 252, 253. If a displayed mouser image is immediately adjacent the punching or sword swinging arm at the time the key 35a, 35b is activated the mouser is destroyed and the players score is incremented by ten, as indicated by blocks 254, 256. The score is continually displayed during the game play except when the turtle image is under water.

If the player fails to hit an approaching enemy mouser or star, and fails to move out of the way, the player controlled turtle image may be hit (i.e., run into) by the enemy mouser or star. If that event occurs, the player controlled symbol is shown as destroyed by removing the player controlled turtle temporarily from the screen and removing one of the remaining turtle symbols 177, as illustrated by blocks 260, 262 and 264. The number of remaining player controlled symbols in the game is then determined, as shown at block 268, and if players remain, the player sequence continues, as shown. If no players remain, the game score is displayed, the "GAME OVER" message is displayed with a sound sequence and the display is turned off after a few seconds, as illustrated by blocks 268, 270 and 272. If there are players remaining at block 268, the player symbol is displayed and the game sequence returns to block 248 for continuation of play, as shown.

If the result at block 262 is that the game-controlled image is not hit, then, a check is performed to determine if the down arrow key was pressed when the player controlled turtle image was at the left, ground level location (i.e., the turtle image 94 displayed). If not, the game sequence proceeds to block 248, as shown. If the down arrow key was activated, then the turtle image "dives" under the water, simulated by display of the underwater turtle image segment 140. In addition, the score display 178 set with an under water count. The player controlled turtle image must obtain the dynamite or key and leave the water before the counter counts down to zero. Thus, the time allotted to get through the under water section is limited by the count. Game flow then continues to block 284 of FIG. 4D as indicated at node 282.

The player controlled turtle image is thus manipulated underwater to approach and retrieve the dynamite 182 at the right, lower corner of the display 24 using the direction pushbutton 34a. The turtle image may then move toward the dynamite 182 by moving from the turtle image 140 to the turtle image 144 through the gyrating blade snare to the turtle image 150 and through the shock barrier 74 to turtle images 154 and 160 respectively, as illustrated by block 286-292. When the player controlled turtle image reaches the dynamite (i.e., display of image 160) the dynamite image 182 will be briefly displayed as illustrated at block 294. The player then manipulates the direction keys 34a to direct the turtle image back to the turtle image 156 through the shock barrier 174 to turtle image 152 through the gyrating blade 174 to the turtle image 146 and 142 respectively. The player controlled turtle image then is returned to the surface by activating the up control of the direction key 34a before the counter decrements to zero as illustrated by block 300, 301, and 303.

If the player controlled turtle image is hit by either snare device 173, 174, or fails to return to the surface before the counter reaches zero, the game play sequence branches to block 304 and one turtle life is lost, as shown. A determination is then made to determine if any turtle lives remain for the player, and if not, the game ends with display of the "GAME OVER" image 130, as illustrated by blocks 306, 308. If turtle lives remain, the game sequence returns to block 232 of FIG. 4B as indicated by the node 302 and the game sequence is repeated with the player having to start over to retrieve the dynamite or key. If the player successfully returns to the surface before the counter returns to zero, the counter disappears and the score is displayed and the turtle image 94 is displayed as indicated at block 303 and 305. The game sequence then continues to FIG. 4E as indicated by node 307.

While underwater, the gyrating blade snare device 173 continually simulates rotating motion by sequential display of two segments 162-172 at a time. If the segments 164 and 170 are displayed (i.e., horizontal blade position), the turtle image may pass through unharmed by moving from turtle image 144 to image 150 or from image 152 to image 146. However, if the blades 166 and 172 or blades 162 and 168 are displayed, the turtle life will be lost if the player tries to move the player controlled turtle image through the gyrating blades at that time. (i.e., if the turtle is in the position 144, 146, 150 or 152 when any non-horizontal blades are displayed). This will cause the fallen turtle image 148 to be temporally displayed, a buzzer sound to be generated and a decrease by one of the turtle lives remaining in the game. The underwater shock barrier 174 periodically generates a current illustrated by periodic display of the shock image segment 174. If the play controlled turtle image attempts to pass from turtle image 150 to 154 or from turtle image 156 to 152 while the shock image segment is displayed, the turtle life will be lost resulting in on-off flashing of the turtle image, a buzzer sound and a decrease of one turtle life remaining in the game. In the illustrated embodiment gyrating blades moves from one position to the next in 0.7 second for level one play, 0.5 second for level two play and 0.3 second for level three play. The shock barrier has a display interval of 0.7 second for level one, 0.5 second for level two and 0.3 second for level three in the illustrated embodiment.

After the player controlled turtle image has returned to the surface so that the turtle image 94 is displayed, the player then moves the player controlled turtle image toward the capsule 114 on the right by manipulating the direction keys 34a, as illustrated by block 320 of FIG. 4E. The player controlled turtle image is moved to the right by pushing the right arrow 36b of the direction key 34a. To jump to the upper level, the up arrow 36a is pushed after which the image will return to the lower level automatically after 0.5 seconds or can be immediately returned by activating the down arrow 36c. Moving a turtle image from one position to another in the illustrated embodiment takes 0.1 second. During the entire time player controlled images are being moved toward the capsule 114, the mousers 104, 106, 108, 110 and throwing stars 124 attack and must be destroyed or avoided or the turtle life will be lost if a simulated collision occurs, as shown by block 322, 324 and 304. When the player controlled turtle image, after having obtained the dynamite, approaches the capsule by moving to turtle image segment 102, the dynamite is set off. The turtle automatically returns to turtle image position 100, and the score is increased by fifty. The explosion image segment 118 is displayed to show the explosion, the dynamite image 186 disappears and the crack 116 in the capsule appears, as illustrated by blocks 326, 328. The turtle image position closest to the capsule cannot be entered unless the dynamite or key has been obtained.

After the explosion, if the capsule is not yet destroyed, the player controlled image must return to the left and then dive underwater and retrieve more dynamite in the same manner as previously described, as illustrated by blocks 330, 332 and 244. For a level one game, capsule is destroyed by two explosion of dynamite, three explosions for level two and four explosions for level three. Once the capsule has been destroyed, the capsule 114 will disappear, the score will be increased by one hundred, and player controlled turtle image then returns to the left and dives underwater again to obtain the handcuff key 180 which appears in the lower right corner of the display 24, as illustrated by blocks 334, 336 and 244. When the key is obtained, the player controlled image is returned to the capsule and upon entering the turtle image position 102, the key 180 disappears, the land cuffs 122 disappear, the prisoner April raises her hands 121, the "THANK YOU" message 128 is displayed, and the score is increased by two hundred. In addition, the turtle image 102 displays a raised hand 101, the score flashes, "GAME OVER" is displayed, and after sixty seconds, the display will turn off, as indicated by blocks 338, 340.

A specific program listing for use with the illustrated embodiment in which the SM-510 processor is used is shown in Appendix A. The program shown is a hexadecimal object code listing having a hexadecimal program address on the left followed by a hexadecimal representation of the object code. The program includes both image segment control and sound generation code.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Specific embodiments of the novel electronic handheld video game according to the invention have been described for purposes of illustrating the manner in which the invention may be made and used. It should be understood that implementation of other variations and modifications of the invention in its various aspects will be apparent to those skilled in the art, and that the invention is not limited by the specific embodiments described. It is therefore contemplated to cover by the present invention any and all underlying modifications, variations or equivalents that fall within the true scope of the basic underlying principles disclosed and claimed herein.

APPENDIX A

Copyright Konami 1989

```
1 *----------------------------------------------------------*
2 *              BH005   TMNT                                 *
3 *                     prog                                  *
4 *              ROM addr  0000H thru 0FFFH                   *
5 *                     By  KONAMI                            *
6 *----------------------------------------------------------*
7 * addr   0  1  2  3  4  5  6  7  8  9  A  B  C  D  E  F    *
8 *----------------------------------------------------------*
9  <0000> 7D 00 00 54 6F 00 66 5F 6A 54 00 97 5F 5F 97 7A
10 <0010> 97 5F 79 54 97 00 6F 6B 6F 97 AA 69 57 6F 5A 61
11 <0020> 00 6F 97 6A 56 5F 7A 80 5F 6F 00 0E 97 56 6F 91
12 <0030> 5F 54 6F 5F 67 72 5F 73 08 75 56 1F 54 72 BD 00
13 <0040> 7D 00 00 6E 14 00 6F 18 5C 5F 6E 5C 5F 54 10 B3
14 <0050> 5C 5F 10 54 04 AA 5F 04 08 6E 5C 30 54 5F 6A 5F
15 <0060> 40 5F 1A 5F 08 0A 7C 6E 55 6F 6A A7 10 1A 6F 64
16 <0070> 7B 5C 10 5F AE 5F 5F 57 FD A2 6F B3 7F 07 C0 00
17 <0080> 7D 6E 8A 6A 1C 32 0E 1C 5F 20 60 12 61 07 20 7F
18 <0090> 6A 6E 11 60 A0 30 20 83 10 6E B3 20 04 64 65 76
19 <00A0> B4 67 9B 6C 08 20 C8 16 B3 31 32 06 5F 11 00 80
20 <00B0> 7D 20 54 0C 6E 0F 09 7F A5 83 5F 35 7D 5F A9 00
21 <00C0> 5F 00 00 5F 61 00 9F 08 00 9B 00 5F 00 15 5F 32
22 <00D0> 54 9F 54 00 00 00 9B 08 61 00 61 58 6E 9F 60 60
23 <00E0> 08 0A 93 54 00 0A 00 9E 9B 00 00 54 6A 6F 5F 31
24 <00F0> 54 9B 00 60 61 9B 9F 60 9B 30 35 32 61 30 00 00
25 <0100> 56 00 2F 10 0F 75 2A 2F 0F 64 CE 20 0F 04 12 2D
26 <0110> 6A 6A 5F 53 6A 7E 9F 12 04 5F 5F 27 A5 2F 10 2D
27 <0120> AE 2F 0E 10 69 15 25 6A 9F 85 67 2A 2E 6A 27 10
28 <0130> 52 5F 70 9F 25 10 10 5F 9D 27 A5 04 28 29 12 00
29 <0140> 20 00 00 0C 5F 00 62 14 19 05 70 07 2E 5F 28 5F
30 <0150> 64 0F 7E 75 15 74 63 20 6A 6B 9D AA 20 6C B8 EC
31 <0160> 53 5F 65 2C 2C 5F 5F 0F 2C 22 0C 10 C0 5F 13 5F
32 <0170> BE 10 10 20 10 69 6A 0F 74 11 5F 28 11 53 7E 00
```

| # | Addr | | | | | | | | | | | | | | |
|---|---|---|---|---|---|---|---|---|---|---|---|---|---|---|---|
| 33 | <0180> | 26 | F0 | 29 | 04 | 5F | 0C | 62 | 54 | 5F | 04 | 76 | 80 | 68 | 5F | 65 | 5F |
| 34 | <0190> | 69 | 0C | 76 | 80 | 28 | 5F | 0D | B4 | 5F | 82 | 80 | B8 | 62 | 5F | 05 | 68 |
| 35 | <01A0> | 62 | 5F | 65 | 98 | 78 | 5F | 02 | 6B | 0D | 5F | 04 | 6B | 76 | 6B | 54 | 25 |
| 36 | <01B0> | 5F | 04 | 54 | 0D | 7D | 07 | 54 | 80 | 69 | 5F | F0 | 5F | 55 | 69 | B9 | 00 |
| 37 | <01C0> | 20 | 6F | 74 | EF | 76 | F1 | 69 | 6A | 53 | 66 | 74 | 6A | 78 | A8 | EF | 53 |
| 38 | <01D0> | F0 | 2A | 5F | 29 | 82 | EF | EF | 7A | 40 | EF | 53 | 91 | 20 | 69 | 22 | 9A |
| 39 | <01E0> | 10 | 7A | 9E | 67 | 93 | 67 | 80 | B5 | 24 | 53 | 69 | C0 | 23 | 69 | 10 | 69 |
| 40 | <01F0> | 5F | 78 | 69 | 5F | 53 | 21 | 53 | 70 | 02 | 31 | AC | 5F | 0C | 0F | 71 | 00 |
| 41 | <0200> | 69 | 00 | 29 | 24 | B9 | B9 | 77 | 0E | 54 | 0F | 0F | 05 | 0E | 5F | 19 | 0F |
| 42 | <0210> | 05 | 78 | 0E | 0E | 04 | 7A | 04 | 68 | 29 | 05 | 04 | 24 | 6F | 0F | 0E | 04 |
| 43 | <0220> | EF | 14 | 5F | B9 | 82 | 6C | 19 | 19 | 5F | 64 | 5F | 54 | 54 | 15 | 5F | 19 |
| 44 | <0230> | 5F | 5F | 04 | 0F | 67 | B1 | A2 | 05 | 66 | 24 | 0E | 6C | 54 | 05 | AE | 00 |
| 45 | <0240> | 5F | 5E | 77 | 78 | 56 | BB | F0 | 19 | 77 | 67 | 0C | 74 | 56 | 7C | 07 | 6C |
| 46 | <0250> | 5F | 06 | 5F | 06 | 19 | 15 | 00 | 61 | 66 | 69 | 64 | 0D | 04 | 06 | 0D | 90 |
| 47 | <0260> | 64 | 39 | B2 | 07 | 40 | 6F | 82 | 0D | 75 | 07 | 23 | 04 | 0C | 6C | 5F | 5F |
| 48 | <0270> | 55 | 5F | 5F | 5F | 57 | 5F | 19 | 66 | 83 | 5F | 92 | 0C | 19 | 69 | 00 |
| 49 | <0280> | 6B | 00 | 00 | 78 | 3F | 00 | 14 | 10 | 7D | 5F | 00 | 88 | 00 | 20 | 20 | BC |
| 50 | <0290> | 5F | 82 | 10 | 00 | 00 | 00 | 53 | 00 | 76 | 80 | 90 | 04 | CB | B6 | 53 | 69 |
| 51 | <02A0> | F0 | 83 | 54 | 6A | 27 | 20 | 00 | 68 | 20 | 00 | 00 | 19 | 1D | 19 | 5F | 70 |
| 52 | <02B0> | 6B | 67 | 25 | 00 | 19 | 53 | 5F | 5F | 00 | 77 | 53 | 0F | A8 | 28 | 0F | 00 |
| 53 | <02C0> | 5F | 2F | 7A | 10 | 06 | B1 | 90 | 57 | 56 | 77 | 82 | 82 | 69 | 53 | 75 | 6B |
| 54 | <02D0> | 18 | 62 | 10 | 94 | 5F | 56 | 53 | 67 | 31 | 5F | 20 | 10 | AB | 5F | 0C | 31 |
| 55 | <02E0> | 5F | 6C | 5F | A2 | 99 | 20 | 56 | 24 | 3F | B1 | 6B | 5F | 18 | 2E | 76 | 30 |
| 56 | <02F0> | 54 | 5F | B1 | 6B | 30 | 5F | 31 | 10 | 90 | HA | 10 | 5F | 6C | 61 | 18 | 00 |
| 57 | <0300> | 0C | 6E | 06 | 29 | 14 | 05 | 06 | 06 | 64 | 20 | 04 | 05 | 07 | 0F | B1 | 90 |
| 58 | <0310> | 6A | 06 | 75 | 20 | 06 | 64 | 6E | 19 | 6E | 05 | 70 | 05 | 7C | 56 | 69 | 40 |
| 59 | <0320> | 69 | 5A | 05 | 0F | 20 | 5F | 64 | 68 | 40 | 14 | 02 | 06 | 55 | 0F | 0E | 69 |
| 60 | <0330> | 40 | 5F | 14 | 30 | 5F | 5F | 6E | 40 | 69 | 5F | 20 | 69 | 40 | C0 | 69 | 00 |
| 61 | <0340> | 5F | 00 | 00 | 94 | 93 | 00 | 3F | B6 | 93 | 30 | 00 | 21 | 74 | 5F | 56 | 6E |
| 62 | <0350> | 93 | 32 | 6A | 5F | 7C | 00 | 69 | 20 | 04 | 30 | FF | 55 | 53 | 96 | 10 | 29 |
| 63 | <0360> | 07 | AB | 6A | 5F | 6A | 93 | 6F | 5F | 5F | 3F | 40 | 13 | 93 | 93 | BC | 11 |
| 64 | <0370> | 54 | 3F | AB | 15 | 00 | 69 | 69 | 29 | 6E | 24 | 57 | 13 | 5F | 29 | 00 | 00 |
| 65 | <0380> | 20 | 00 | 01 | 23 | 30 | 27 | 8F | 11 | 5F | 3C | C0 | 53 | 6D | 05 | 5F | A9 |
| 66 | <0390> | B4 | 18 | 91 | AB | 6B | 75 | 24 | H5 | 5F | B5 | 53 | 56 | 21 | AF | B2 | 65 |
| 67 | <03A0> | 10 | 53 | 10 | 20 | 0F | B9 | 5C | 70 | BE | 5C | 5C | BE | 5C | 91 | 53 | 68 |
| 68 | <03B0> | 6A | 10 | 53 | 5F | 24 | 22 | 07 | 5B | 5F | 0F | 53 | BF | 68 | 78 | F0 | 00 |
| 69 | <03C0> | 5F | AB | 6F | AB | 54 | 54 | A1 | 54 | 5F | 6D | 7A | 92 | AB | 56 | 67 | 56 |
| 70 | <03D0> | 68 | 6E | 5F | 78 | 95 | 5F | 54 | 6F | 5F | A6 | 66 | 97 | 7A | 5F | 78 | 6A |
| 71 | <03E0> | 68 | 5F | BB | 9B | 76 | 6E | 5F | B9 | 56 | 54 | AB | 6E | 69 | AB | 55 | 57 |
| 72 | <03F0> | 57 | AB | 54 | AB | 9D | 5F | 55 | BD | BE | 5F | AB | AB | AB | 5F | 5F | 00 |
| 73 | <0400> | 5B | 00 | 00 | 11 | 11 | 00 | 20 | 11 | BC | 5F | 00 | 5B | 10 | 15 | 20 | 11 |
| 74 | <0410> | 15 | 32 | 65 | 00 | 00 | 00 | 08 | 15 | 20 | 6F | 20 | 01 | 11 | 15 | 20 | EE |
| 75 | <0420> | BB | 20 | 18 | 20 | 20 | 6E | 20 | 20 | 00 | 00 | 20 | 10 | 5F | 20 | 5F |
| 76 | <0430> | 50 | 15 | 10 | 15 | 11 | 11 | 6E | 24 | 77 | 20 | 20 | 20 | C3 | 15 | 7F | 00 |
| 77 | <0440> | 7F | 00 | 9C | B4 | 34 | 7E | 29 | 8H | 55 | 60 | B1 | 7E | 56 | A1 | 54 | 6D |
| 78 | <0450> | BA | 6E | 66 | 21 | 57 | 24 | 92 | 5F | 0F | B1 | 54 | 7F | 60 | 0C | 62 | 6D |
| 79 | <0460> | C8 | 55 | 0C | 23 | 8C | 95 | 94 | 50 | 2A | B1 | B5 | 20 | 11 | 54 | 50 | 50 |
| 80 | <0470> | 62 | 5F | 22 | 10 | B1 | 10 | 5F | 5F | 62 | 62 | 5F | 0C | 62 | 11 | 63 | 00 |
| 81 | <0480> | 65 | 00 | AB | 30 | 6A | 9D | 30 | 91 | 7E | 0D | 61 | B4 | 63 | 32 | 61 | 6E |
| 82 | <0490> | 64 | 5F | 7E | 6E | 08 | 9A | B6 | 9B | 60 | 5F | 60 | 60 | 9A | 6E | AF | 65 |
| 83 | <04A0> | 01 | 30 | 0B | 60 | 05 | 5F | 04 | 5F | 9A | 5F | 54 | 60 | 32 | 32 | 61 | 01 |
| 84 | <04B0> | 5F | 31 | 02 | 08 | 60 | 31 | 30 | 5F | 08 | 54 | 30 | 08 | 5B | 5B | A0 | 00 |
| 85 | <04C0> | 5F | 6E | 06 | 6A | 64 | 19 | 0F | 07 | 6C | 5F | 07 | 6B | 19 | 0E | 06 | 69 |
| 86 | <04D0> | 72 | 05 | 6E | 05 | 7E | 06 | 5F | 06 | 5F | 07 | B3 | 1C | 5F | 05 | 00 | 10 |
| 87 | <04E0> | 20 | 67 | 04 | 6C | 04 | 04 | 04 | 30 | B3 | 5F | 05 | 07 | 72 | B6 | 6D | 69 |
| 88 | <04F0> | 69 | 9D | 06 | 6E | 5F | 6A | 20 | 30 | 30 | 6E | 62 | 6E | 6E | 5F | 5F | 00 |
| 89 | <0500> | 77 | 00 | 00 | 31 | 10 | 00 | 1B | 1C | 8A | 30 | 7B | 12 | 18 | 12 | 30 | 5F |
| 90 | <0510> | 10 | 53 | 31 | 94 | 10 | 59 | 5F | 10 | 30 | 11 | 30 | 31 | 65 | 51 | 01 | 07 |
| 91 | <0520> | 2F | 30 | 19 | 1B | 19 | 1B | 31 | 01 | 5F | 23 | 26 | 1B | 13 | 10 | 5F | 69 |
| 92 | <0530> | 19 | 31 | 20 | 5B | 14 | 31 | 18 | 3C | 00 | 80 | 18 | 69 | 5F | 10 | 65 | 00 |
| 93 | <0540> | 76 | 00 | 9F | B1 | 67 | 74 | 57 | 76 | 6A | 5F | 0F | 5F | 36 | 64 | 5F | 5F |
| 94 | <0550> | 28 | 5F | 06 | 5F | 07 | 68 | 80 | 80 | 78 | 68 | 05 | 68 | 68 | 07 | 07 | 68 |
| 95 | <0560> | 67 | 68 | 0D | 0F | 57 | 78 | 80 | 67 | 80 | 6A | 5F | 5F | 56 | 07 | 0D | 33 |
| 96 | <0570> | 5F | 5F | B5 | 55 | 5F | 67 | 91 | 80 | 76 | 80 | 68 | 5F | 57 | 76 | 8F | 00 |
| 97 | <0580> | 54 | 00 | C0 | 61 | 68 | 24 | 5F | 5F | 40 | 0B | EE | 7D | 63 | 0E | 36 | 00 |
| 98 | <0590> | 64 | 6B | 68 | 85 | 19 | 74 | 5F | 69 | 96 | 5F | 64 | 19 | 5F | 75 | 78 | 54 |
| 99 | <05A0> | BC | 04 | 00 | 64 | 77 | 00 | 55 | 6B | 54 | 05 | 0E | 9D | 07 | 04 | 04 | 9E |

| | | | | | | | | | | | | | | | | |
|---|---|---|---|---|---|---|---|---|---|---|---|---|---|---|---|---|
|100|<05B0>|04|57|F4|CF|82|5F|9D|5F|9E|5F|04|2E|5F|OC|24|00|
|101|<05C0>|02|00|00|0C|5F|00|6C|5F|50|5F|00|5F|74|5F|05|6B|
|102|<05D0>|0B|5F|0C|00|00|00|05|00|A1|6B|02|05|19|A1|5F|19|
|103|<05E0>|19|29|0C|66|2A|64|A1|56|5F|00|00|06|04|6C|0C|00|
|104|<05F0>|06|54|10|A8|24|6C|19|6C|5F|06|57|00|68|A1|0C|00|
|105|<0600>|5F|00|00|5F|6A|00|67|80|6B|8C|00|5F|5F|76|6B|19|
|106|<0610>|54|92|54|29|00|00|9C|6B|0C|40|80|6A|74|92|0C|92|
|107|<0620>|66|68|30|5F|80|29|2B|0D|B8|5C|00|0E|00|0C|6F|6B|
|108|<0630>|54|29|29|6C|6A|6B|5F|80|B3|0D|00|5F|6A|68|82|00|
|109|<0640>|5F|00|00|B8|28|00|56|6A|64|0C|00|5F|5F|7D|0C|AF|
|110|<0650>|AA|5F|19|0C|6F|6E|00|6A|C0|04|5F|5F|54|7C|55|93|
|111|<0660>|28|6A|89|F0|54|6C|23|A1|6B|74|28|30|0C|63|91|74|
|112|<0670>|0C|26|AA|28|80|B3|0D|6F|00|57|5F|5F|5F|6E|6C|00|
|113|<0680>|5F|00|CB|9C|54|22|A1|5F|6A|6C|80|5F|5F|55|92|5F|
|114|<0690>|63|04|02|02|20|6A|49|74|92|03|23|92|05|0C|92|0E|
|115|<06A0>|2B|5F|8C|2E|80|63|64|64|56|5F|00|6F|6B|0C|6B|
|116|<06B0>|56|52|2C|55|82|5F|0E|03|8F|B5|06|68|06|2E|19|00|
|117|<06C0>|60|40|2A|19|05|91|A0|8B|0B|93|0F|5F|26|56|F3|6A|
|118|<06D0>|53|6B|55|5F|56|06|0F|23|63|02|04|6F|6F|6B|0E|5F|
|119|<06E0>|E4|29|0F|0E|5F|6F|62|40|19|20|91|54|04|19|5F|5D|
|120|<06F0>|5F|5F|63|6B|54|A8|24|63|5D|49|82|B3|68|AB|E9|00|
|121|<0700>|54|40|25|5F|5A|8F|06|6B|33|74|04|29|06|6B|92|74|
|122|<0710>|0E|68|5F|66|8F|3F|0E|68|5F|74|5F|5F|56|56|06|68|
|123|<0720>|8F|6A|AA|28|82|A4|5F|6F|8F|0E|5F|36|66|68|B4|11|
|124|<0730>|5F|82|5F|5F|5F|82|06|82|6A|68|66|5F|56|6A|B3|00|
|125|<0740>|6B|00|00|22|32|00|B8|20|60|6A|00|6A|19|68|5F|B8|
|126|<0750>|E4|5F|82|AA|56|27|B2|68|67|04|10|6A|5F|E9|68|0D|
|127|<0760>|00|68|02|20|00|1F|53|21|5F|2A|20|E9|35|30|10|68|
|128|<0770>|20|B3|5F|6B|20|5F|82|E9|68|E4|68|5F|E4|00|5F|00|
|129|<0780>|5F|00|00|24|88|00|5F|04|5F|53|80|5F|06|05|28|64|
|130|<0790>|5F|B1|2B|00|60|2C|6F|05|2A|11|05|64|02|5F|02|AA|
|131|<07A0>|25|06|20|06|22|00|02|05|26|19|12|51|04|02|2A|05|
|132|<07B0>|04|5F|22|64|04|60|05|05|05|06|02|64|64|06|06|00|
|133|<07C0>|5F|00|00|14|14|F0|2E|14|2E|2E|2E|20|5F|14|2A|14|
|134|<07D0>|14|14|30|22|5F|0C|14|14|2A|14|22|14|14|14|2E|4F|
|135|<07E0>|0B|25|2F|20|14|15|00|2B|26|10|08|2C|14|2E|20|6A|
|136|<07F0>|0C|14|20|14|14|14|2F|1B|6B|26|2C|5F|00|40|5F|00|
|137|<0800>|5F|B8|40|5F|2F|5F|A8|10|5F|5F|6E|0B|94|54|A3|2F|
|138|<0810>|AE|99|1B|71|5F|10|50|82|66|54|A3|85|62|0C|5F|80|
|139|<0820>|40|61|55|5F|22|64|5F|55|5F|95|20|10|18|5F|54|5F|
|140|<0830>|B8|30|95|80|60|0C|09|50|66|5F|10|0B|18|10|09|00|
|141|<0840>|5F|B8|20|0B|1E|2E|1B|E4|5F|5F|5F|21|22|3E|68|13|
|142|<0850>|B4|E9|E4|E4|2E|E9|B8|9A|68|B8|5F|0E|2A|20|20|20|
|143|<0860>|3E|6C|6B|5F|1F|6B|6B|1B|6E|5F|6B|22|E9|6B|53|11|
|144|<0870>|13|0E|6B|31|0B|00|5F|29|29|10|80|53|53|A7|A7|00|
|145|<0880>|5F|B3|2D|52|82|40|00|5F|0C|56|2B|6E|0E|01|6E|62|
|146|<0890>|80|3F|24|3F|6E|80|A5|85|B6|24|66|66|00|82|6A|5F|
|147|<08A0>|5D|6E|5F|68|6F|5F|5F|0B|5F|0C|6B|B9|6E|56|52|62|
|148|<08B0>|20|56|5F|66|6A|65|5F|11|14|01|56|AE|B0|0B|6E|00|
|149|<08C0>|5F|C7|2A|02|40|6E|06|53|82|2B|10|53|0E|04|2F|04|
|150|<08D0>|04|53|22|00|0F|2B|20|64|61|0D|64|5F|06|00|64|05|
|151|<08E0>|65|64|2A|9B|5F|A2|6C|05|2C|0E|19|04|04|50|02|02|
|152|<08F0>|06|5F|62|64|0B|05|6E|64|02|04|5F|06|64|02|04|00|
|153|<0900>|5F|00|02|11|69|25|68|5F|5F|0D|C2|05|95|82|0F|BC|
|154|<0910>|5F|85|2A|21|25|25|60|05|B4|A6|57|BC|5F|6A|25|5F|
|155|<0920>|2B|80|35|60|6A|5F|69|5F|28|95|DF|5F|68|5F|2A|2A|
|156|<0930>|22|55|52|28|02|28|0C|55|E2|0E|5F|AB|2B|68|62|00|
|157|<0940>|26|00|00|6A|06|00|5F|06|0E|74|00|33|AA|0E|66|56|
|158|<0950>|AC|66|5F|68|80|30|68|68|0E|55|6A|56|80|5F|68|06|
|159|<0960>|62|56|5F|5F|5F|80|05|86|68|0C|26|06|5F|A4|5F|68|
|160|<0970>|5F|68|68|68|28|5F|74|11|6A|36|80|80|56|5F|80|00|
|161|<0980>|5F|00|00|5F|04|00|80|5F|A6|99|00|5F|C0|6B|A2|B9|
|162|<0990>|0C|9C|54|BE|00|00|6F|82|B8|28|A6|68|0D|54|57|
|163|<09A0>|2A|66|6A|29|28|2C|2A|74|19|00|00|6A|6A|28|54|B8|
|164|<09B0>|54|54|4B|6F|00|82|00|6E|BE|5F|6C|2F|6E|00|64|00|
|165|<09C0>|56|80|2B|63|05|BE|5F|19|00|B2|0E|4B|04|4B|06|9A|
|166|<09D0>|BE|64|55|BE|54|04|28|02|00|A9|28|63|5F|A5|F3|A7|

| | | | | | | | | | | | | | | |
|---|---|---|---|---|---|---|---|---|---|---|---|---|---|---|
| 167 | <09E0> | AF | 0E | 5F | 56 | BE | 19 | 00 | 5F | 5F | 19 | 82 | 74 | BE | 0F | 7E | 19 |
| 168 | <09F0> | 06 | B6 | 54 | 63 | 63 | 6F | 5F | 57 | 19 | 0E | 56 | A8 | 0F | 68 | 76 | 00 |
| 169 | <0A00> | 6A | 00 | 00 | 5F | 9C | 00 | 0F | 5F | 56 | D2 | BE | A7 | 0F | 06 | 9C | 92 |
| 170 | <0A10> | 57 | 78 | 68 | 57 | 29 | 29 | 57 | 5F | A2 | 19 | 82 | 5F | 74 | D2 | 57 | 06 |
| 171 | <0A20> | 67 | 68 | 5F | 79 | 95 | 07 | 19 | 07 | 87 | 95 | 80 | 77 | 06 | 6A | 6F | 19 |
| 172 | <0A30> | 5F | 56 | 06 | 68 | 07 | 56 | 0F | 64 | 75 | D2 | 68 | 0F | 56 | 19 | 97 | 00 |
| 173 | <0A40> | 07 | 00 | 00 | 19 | BH | 00 | 05 | BH | 54 | D2 | 00 | A2 | 64 | A3 | D2 | 64 |
| 174 | <0A50> | 19 | 6C | 68 | 95 | 68 | B8 | 55 | B8 | 54 | 0D | 55 | 00 | 68 | 68 | 00 | 78 |
| 175 | <0A60> | 68 | 0D | 5F | 5F | 95 | 05 | 55 | 55 | 56 | 05 | D2 | 5F | A7 | 19 | 02 | 55 |
| 176 | <0A70> | D2 | 6A | 04 | AB | A3 | 78 | 04 | AB | 78 | 05 | 16 | 05 | 9C | 19 | 5F | 00 |
| 177 | <0A80> | 6A | 00 | 00 | 19 | 67 | 00 | 05 | 65 | 07 | 5F | F1 | 06 | 19 | 8E | 5F | 19 |
| 178 | <0A90> | 55 | 95 | D2 | 95 | 68 | 75 | 89 | D2 | 07 | 0E | 55 | 74 | 05 | D2 | 05 | 57 |
| 179 | <0AA0> | 30 | 0C | 57 | 57 | 19 | 68 | 56 | 0C | BE | 06 | 07 | 5F | 0F | 56 | 68 | 5F |
| 180 | <0AB0> | 0E | 89 | 6C | 55 | 05 | 78 | 5F | 79 | 78 | AB | 68 | 55 | 4E | AB | 78 | 00 |
| 181 | <0AC0> | 58 | 00 | 00 | 10 | 11 | A9 | 6E | 10 | 74 | 5F | A9 | 0C | 57 | 10 | 20 | 14 |
| 182 | <0AD0> | 30 | 10 | 70 | 07 | 56 | 06 | 15 | 5F | 54 | 01 | 5D | 6C | 60 | A5 | 8D | 34 |
| 183 | <0AE0> | BB | 31 | 28 | 5F | 6F | 75 | 94 | 20 | 10 | A3 | 85 | 08 | A5 | 23 | 34 | 8D |
| 184 | <0AF0> | 6E | 7C | 5F | 10 | 2B | 04 | 04 | 1C | 5F | 67 | 53 | 18 | 06 | 31 | 19 | 00 |
| 185 | <0B00> | 5F | 00 | 80 | 9D | 91 | 7F | 53 | 57 | 05 | 57 | 0F | 92 | 5F | 21 | 67 | 10 |
| 186 | <0B10> | 61 | 64 | 64 | 18 | 30 | 5F | 57 | A0 | 74 | 10 | 01 | 5F | 8D | 5F | B3 | 9C |
| 187 | <0B20> | 60 | 5F | 8B | 9B | 19 | 8B | 5D | BB | 57 | 3F | 10 | 57 | 7F | 60 | 5F | 5F |
| 188 | <0B30> | 04 | 6B | 70 | 70 | 9B | 9B | F6 | 9C | AA | 53 | B1 | 18 | 0F | 3D | 04 | 00 |
| 189 | <0B40> | 69 | 92 | 6F | 55 | 91 | 55 | 92 | 92 | B2 | 54 | 92 | 6F | 55 | 83 | A3 | 79 |
| 190 | <0B50> | 92 | 55 | 7A | 92 | 60 | 85 | 92 | 6E | 92 | 68 | 54 | 55 | 54 | 54 | 11 | 60 |
| 191 | <0B60> | 40 | AB | 92 | 56 | 92 | 5F | 6F | 00 | 6F | 5F | 56 | 5F | 5F | 8B | AB | 30 |
| 192 | <0B70> | 69 | AC | 5F | 5F | 5F | 67 | 69 | 5F | 40 | 76 | 28 | 6C | 70 | 40 | 00 |
| 193 | <0B80> | 64 | 6E | 10 | 25 | 21 | 20 | 90 | 20 | 56 | A7 | 0F | 54 | 34 | 54 | 1F | 77 |
| 194 | <0B90> | 5F | 6E | 20 | 5F | 20 | 5F | 08 | 57 | 71 | 60 | B3 | 10 | 5F | 5F | 0F | 5F |
| 195 | <0BA0> | 54 | B3 | 10 | 53 | 93 | 8A | 50 | BE | 1C | 1F | 11 | 8D | 11 | 5F | 1C | 7E |
| 196 | <0BB0> | 9E | 6E | 67 | 71 | 55 | 08 | 76 | 56 | 04 | 71 | 08 | 0F | 0D | 07 | 15 | 00 |
| 197 | <0BC0> | 0A | 00 | 0E | 06 | 07 | 70 | A7 | 18 | 55 | A0 | 00 | 5F | 6F | 5F | 0D |
| 198 | <0BD0> | 6C | 67 | 57 | 9C | 9C | 53 | 9C | 6C | 67 | 6C | 9C | 9C | 0F | 6C | 70 | 53 |
| 199 | <0BE0> | 69 | A0 | 5F | 9C | 99 | 60 | A9 | 6C | 57 | 6C | 2A | 55 | 55 | 6C | A0 | AA |
| 200 | <0BF0> | 70 | 5F | 9C | 55 | BB | 8D | AD | 5F | 5F | 97 | 07 | 67 | 0F | 57 | 24 | 00 |
| 201 | <0C00> | 7F | 00 | 00 | 56 | 6A | 00 | 6H | 6E | 9D | FC | 6E | 05 | 19 | 5F | 0F | 19 |
| 202 | <0C10> | 07 | 71 | 69 | 6E | 5F | 10 | 0C | 64 | 6E | 10 | 6E | 04 | 19 | 06 | 6E | 5F |
| 203 | <0C20> | 12 | A3 | 67 | 19 | 5F | 6E | 10 | 54 | 19 | 18 | 3D | 0C | 00 | 64 | 04 | 08 |
| 204 | <0C30> | 65 | 54 | 2F | 8D | 0E | 05 | 19 | 5B | 01 | 0D | 6C | B8 | 6A | 65 | 67 | 00 |
| 205 | <0C40> | 24 | 00 | 00 | 00 | 6C | CF | 19 | 0F | 6E | 00 | 70 | A4 | 0F | 05 | AD | 19 |
| 206 | <0C50> | 04 | 04 | 19 | 07 | 6C | 6E | 54 | 5F | 07 | 8A | BA | 6E | 07 | 56 | 0E | 8D |
| 207 | <0C60> | BE | 6C | 0D | 19 | 64 | 05 | 19 | 0F | 0D | 0E | 07 | 66 | 6C | 64 | 6E | 5F |
| 208 | <0C70> | 29 | 0E | 56 | 06 | 6E | 54 | 06 | 75 | BE | 64 | 64 | 57 | 20 | 92 | 71 | 00 |
| 209 | <0C80> | 7A | 00 | 00 | 05 | 8D | 00 | 67 | BD | BD | 0E | 00 | 06 | 07 | 76 | 6A | 04 |
| 210 | <0C90> | BD | 6A | BD | BD | BD | 00 | BD | 04 | 0E | BD | 0C | 0E | 6A | 05 | 1B | 61 |
| 211 | <0CA0> | DC | 6A | 07 | 00 | 0F | 6A | 6A | 00 | 0F | 00 | 6A | 6A | 6A | BD | 91 |
| 212 | <0CB0> | 5F | BD | 6A | BD | 6A | BD | BD | 73 | 08 | 0C | BD | 1F | 54 | 73 | BD | 00 |
| 213 | <0CC0> | 7F | 6E | 05 | 54 | 6A | 7E | 08 | 6A | 6A | 0D | 5F | AA | B3 | 5F | 05 | 7C |
| 214 | <0CD0> | 5F | 05 | 7E | 6A | 00 | B3 | 00 | 07 | 6A | 6A | 04 | 6A | 54 | 4E | 1B | 61 |
| 215 | <0CE0> | 08 | A5 | B3 | 4E | B3 | 5F | 05 | 10 | 7E | B3 | 6A | 5F | 4E | 4E | 6F | AE |
| 216 | <0CF0> | 5F | 00 | 00 | 5F | 00 | 63 | 05 | 73 | 08 | 7E | 6A | 1F | 54 | 73 | BD | 00 |
| 217 | <0D00> | 19 | AF | 7A | 5F | A4 | D2 | 06 | 83 | D2 | 55 | 68 | 0C | 82 | B4 | 04 | 0D |
| 218 | <0D10> | 77 | 68 | 65 | 0C | 54 | 04 | 05 | 67 | 67 | 55 | 56 | 55 | 40 | A3 | 19 | 67 |
| 219 | <0D20> | 56 | 73 | 05 | A2 | 5F | 5F | 05 | 5F | B6 | 19 | 82 | 5F | 5F | A4 | 6A | A7 |
| 220 | <0D30> | 87 | 6A | 77 | 7E | 19 | 63 | 75 | 57 | 06 | 76 | 54 | A7 | 0F | 07 | 6A | 00 |
| 221 | <0D40> | 5F | 00 | 6F | 21 | 06 | 74 | 69 | 7A | 5F | 88 | D2 | 0F | 07 | 87 | 0D | 68 |
| 222 | <0D50> | 6A | D2 | 56 | 19 | 85 | 68 | 78 | 5F | 69 | A5 | B6 | 07 | 78 | 6D | 87 | 6A |
| 223 | <0D60> | 6D | 87 | 68 | 10 | 7A | 19 | 0E | C0 | 1F | 56 | 06 | 7A | 57 | 5F | 0F | 1F |
| 224 | <0D70> | 06 | 5F | 57 | 87 | 87 | 55 | 8B | 87 | 07 | 5F | 5F | 6A | 76 | 37 | 58 | 00 |
| 225 | <0D80> | 6A | 00 | 00 | 53 | 0D | 00 | 2B | 91 | 78 | 35 | 00 | 69 | 00 | 00 | 56 | F0 |
| 226 | <0D90> | 64 | AB | 7C | 00 | 00 | 00 | 40 | 00 | 69 | 00 | 7E | 40 | C0 | AB | 69 | 5F |
| 227 | <0DA0> | 40 | B8 | AE | 9E | E0 | 40 | 00 | 69 | 54 | 00 | 00 | 5F | 40 | 69 | 7C | 00 |
| 228 | <0DB0> | 5F | 0C | 00 | F0 | AE | 11 | 69 | 2F | 6C | 78 | 55 | 53 | 57 | 86 | 9E | 00 |
| 229 | <0DC0> | 60 | 80 | 70 | 5F | 7F | 68 | B4 | 5F | F0 | 1B | 6A | 5F | 69 | 92 | 70 | 5F |
| 230 | <0DD0> | 6A | 68 | 6A | 40 | 69 | 40 | B4 | 7F | 53 | 6A | 15 | 57 | 5F | 69 | 70 | 5F |
| 231 | <0DE0> | 30 | 4F | 40 | 0F | 6A | 0C | 6A | 1C | 1B | 6A | 6A | 11 | B4 | BD | 60 | 0F |
| 232 | <0DF0> | 5F | 28 | 40 | 55 | 68 | 2F | 84 | 6A | 4F | 98 | 0F | 1B | 6A | 69 | 1B | 00 |
| 233 | <0E00> | 69 | 00 | 00 | 7C | 56 | 00 | 5F | 00 | 0E | 80 | 00 | 54 | 00 | 00 | 6C | 04 |

```
234 <0E10> 5F 26 55 EE 26 00 01 90 20 F1 2A 6F 10 00 64 07
235 <0E20> 90 04 A9 5F 0C A4 26 5F 66 0F EB 6B 10 5F 69 5F
236 <0E30> 20 0F 26 6E 0C 40 24 2C 10 21 19 0D 5F 0F 6D 00
237 <0E40> 26 00 00 04 23 00 60 06 8C 0F 00 69 2B 5F 64 5F
238 <0E50> 2A A4 5F 26 00 00 65 B4 0F BB B0 69 6D 06 04 6B
239 <0E60> 62 5F 53 5F 6B 20 A3 2B 0C 62 00 6B 69 9D 54 25
240 <0E70> 5F 6E 5B 0C 20 0C F0 B0 2A 5F 5B 5F 54 2A B9 00
241 <0E80> 5F 00 00 5F 00 00 0F 22 00 00 00 20 00 6E 6E 20
242 <0E90> 02 00 00 00 00 5D 2F 5F 00 5F E9 5F 0F 23 2B
243 <0EA0> 23 6C 00 6B 00 BB 00 10 6E 00 00 53 5D 5F 00 00
244 <0EB0> 62 E4 00 29 5F B4 6B 24 B2 10 2D 6F 20 5F 10 00
245 <0EC0> 5F 00 00 64 A4 6E A5 6F 6F AB 10 A4 6C 55 54 64
246 <0ED0> 6E 54 55 18 15 6C 9A 62 52 18 6C 64 56 64 B1 5F
247 <0EE0> 2B 55 64 6F 5F 64 12 57 6C 6C 18 56 B9 5A 9B 6E
248 <0EF0> 54 64 2E 6E 54 6E A4 22 9F 6C A2 B0 2A 52 B0 00
249 <0F00> 5B 00 BB 04 5F 10 B0 20 69 5F 9B 5A 6A 54 5F AA
250 <0F10> 00 10 B0 5F 18 B5 10 6C 5F 9D 21 3F 19 BB 6A 6E
251 <0F20> BB 5F 26 56 FC 89 62 5F 2F 5F 31 00 5D 30 0D 55
252 <0F30> B0 BE 69 66 53 5F 18 B0 24 0C BE 9B 5F 0E 5F 00
253 <0F40> 26 00 00 A0 32 00 32 65 24 6A 00 69 5F 6A 5F 5F
254 <0F50> 1F 5F A9 0D 5B 00 22 69 AD A9 B0 0E 21 AD 05 6B
255 <0F60> 62 6A A9 54 56 23 65 62 A0 20 00 35 5F 2D BB 00
256 <0F70> 5F A0 B0 0C 6B B0 24 B0 65 69 C0 5F 55 65 92 00
257 <0F80> 20 00 00 11 00 00 20 62 00 00 00 B0 00 0F 6A 69
258 <0F90> 6B 00 00 00 00 10 40 00 00 5F 20 6A 0C 3A 53
259 <0FA0> 53 0C 00 40 00 00 00 00 24 00 00 22 20 22 40 B0
260 <0FB0> BE 24 00 6A 5F 10 10 25 24 40 0B 0F 11 6A 23 00
261 <0FC0> 5F 00 00 5F B3 00 9B B5 5F 6A F0 6A 5F 52 6A 10
262 <0FD0> 02 6E 05 A0 6A 22 00 21 2E 6A AC AE 6F BA 2F 5F
263 <0FE0> 1F 20 00 00 AC B3 5F 5F 0A 5F 00 A0 02 5F 2A
264 <0FF0> 20 6E 0E 23 6A 5F 5F 54 53 0E B3 9E 9F 6E 6E 00
265 *-----------------------------------------------------------
266 *                        music
267 *              ROM addr 0000H thru 00FFH
268 *-----------------------------------------------------------
269 * addr  0  1  2  3  4  5  6  7  8  9  A  B  C  D  E  F
270 *-----------------------------------------------------------
271 <0000> 1C 00 1C 00 1C 00 1C 00 22 22 00 3C 3C 3C 3C 3C
272 <0010> 3C 3C 01 3C 01 12 00 12 00 13 00 13 00 13 00 13
273 <0020> 00 15 00 15 00 15 00 15 00 17 00 17 00 1A 00 1A
274 <0030> 00 1C 00 1C 01 15 15 1D 1C 1A 19 17 1D 00 1D 15
275 <0040> 13 1D 1C 1A 15 13 1D 1C 1A 19 17 15 15 13 13 13
276 <0050> 13 13 13 01 01 01 01 01 1D 00 1C 00 1A 00 19 00
277 <0060> 17 00 25 00 23 01 1D 1A 29 17 15 13 12 3C 12 13
278 <0070> 25 25 25 25 22 15 15 27 1A 19 29 29 29 29 29 29
279 <0080> 29 29 29 29 29 01 29 01 29 29 29 29 29 29 29 29
280 <0090> 29 29 01 00 00 00 27 29 27 00 00 2C 2C 29 27 20
281 <00A0> 2D 2D 2D 2D 2D 2C 29 27 23 22 3C 39 37 01 3C 25
282 <00B0> 2C 2C 3C 3C 25 29 22 27 20 22 22 27 2D 22 3C 25
283 <00C0> 2C 2C 3C 3C 25 25 22 27 2D 22 22 27 2D 3A 3C 25
284 <00D0> 2C 2C 3C 3C 25 25 22 27 2D 22 22 27 2D 22 01 1B
285 <00E0> 3C 25 2C 2C 3C 3C 25 25 22 27 2D 22 22 27 2D 22
286 <00F0> 01 29 2D 01 00 09 00 09 00 1D 01 FF FF FF FF FF
```

What is claimed is:

1. A hand-held electronic game comprising:

a plurality of manually operable control pushbutton switches for permitting control of the play of the game by a player;

sound transducer means for generating sound responsive to sound signals;

control circuit means coupled to the control switches and the sound transducer means, and including a processor, a read-only memory, and a random access memory, for generating game control signals and sound signals;

display means having selectively activatable image segments corresponding to a plurality of player-controlled turtle figures, to a plurality of game-controlled figures including throwing star image segments which may be displayed sequentially to simulate attacking motion, a digital counter, and a prisoner image segment enclosed by a capsule image segment and to alpha-numeric game information for selective display thereof, said display means responsive to said control circuit means control signals for display of game images responsive to the game control signals such that only one player-controlled figure is visually displayed at one time at only on of a plurality of pre-determined positions and the position at which the player-controlled figure is displayed is moveable to an adjacent position responsive to activation of a first set of the control switches, some of said plurality of positions corresponding to underwater positions with associated game controlled intermittently activated snare device image segments and some of said plurality of positions corresponding to above-water positions with associated game controlled attacking image segments, said processor comprising means for generating signals to display destruction of the player controlled image while in an underwater position in response to movement through one of the snare devices during an activated period and while in an above-water position in response to simulated collision with an attacking image segment, means responsive to a control switch for enabling the player to destroy an attacking image segment prior to simulated collision, means for controlling display of a punching arm image segment and a sword image segment associated with a displayed player controlled turtle figure, for simulating destruction of mouser image segments responsive to activation by the player of a punching and sword activating control switch pair, means for controlling the display of dynamite image segments to simulate availability of dynamite, and retrieval of dynamite by a player-controlled figure, means for accumulating a score responsive to simulated destruction of mouser image segments and for controlling display of the score, means for setting a predetermined number in response to the player-controlled turtle figure entering an underwater position, for decrementing the counter periodically until the player-controlled turtle figure exits the underwater position and for simulating destruction of a player-controlled turtle figure, and means for controlling the display of the capsule image segment and prisoner image segment to simulate freeing a prisoner.

* * * * *

UNITED STATES PATENT AND TRADEMARK OFFICE
CERTIFICATE OF CORRECTION

PATENT NO.  : 5,150,899
DATED       : September 29, 1992
INVENTOR(S) : Kazumi Kitaue It is certified that error appears in the above-identified patent and that said Letters Patent is hereby corrected as shown below:

In column 3, line 30, change "there" to --their--;

In column 3, line 31, change "axis" to --axii--;

In column 3, line 38, change "a reset" to --an on/start--;

In column 3, line 39, delete "for";

In column 9, line 28, change "land" to --hand--;

In column 18, line 28, change "on" to --one--.

Signed and Sealed this

Thirtieth Day of November, 1993

Attest:

BRUCE LEHMAN

*Attesting Officer*    *Commissioner of Patents and Trademarks*